June 12, 1928.  W. A. KOSKEN  1,673,250

MOVING PICTURE

Filed Dec. 13, 1922   5 Sheets-Sheet 2

INVENTOR.
Wilho A. Kosken
BY Jas. H. Griffin
ATTORNEYS.

June 12, 1928.
W. A. KOSKEN
MOVING PICTURE
Filed Dec. 13, 1922
1,673,250
5 Sheets-Sheet 3
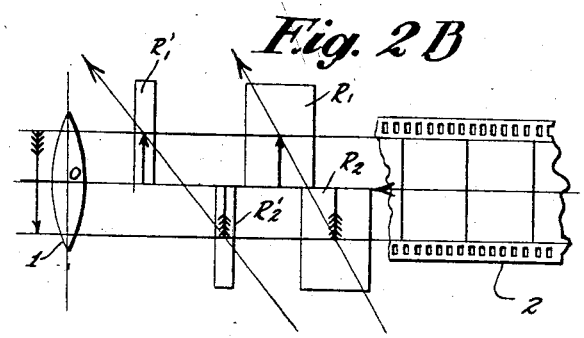
Fig. 2B
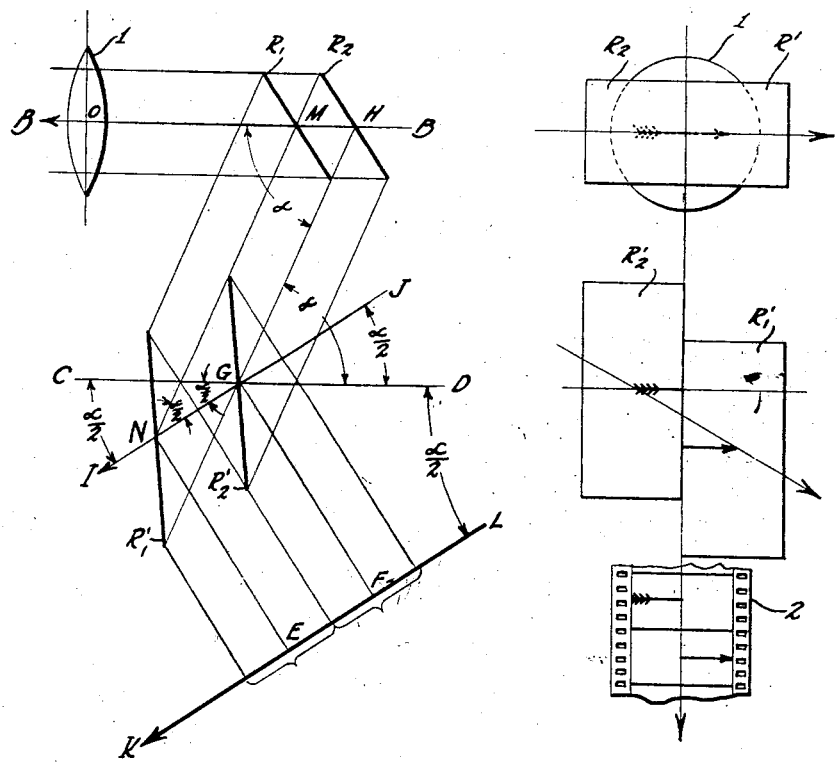
Fig. 1B
Fig. 3C
INVENTOR.
Wilho A. Kosken
BY Jas. H. Griffin
ATTORNEYS.

June 12, 1928. 1,673,250
W. A. KOSKEN
MOVING PICTURE
Filed Dec. 13, 1922  5 Sheets-Sheet 5

INVENTOR.
Wilho A. Kosken
BY Jas. H. Griffin
ATTORNEYS.

Patented June 12, 1928.

1,673,250

UNITED STATES PATENT OFFICE.

WILHO A. KOSKEN, OF NEW YORK, N. Y., ASSIGNOR TO STEADYLITE MOTION PICTURE MACHINE CORPORATION, OF NEW YORK, N. Y., A CORPORATION OF NEW YORK.

MOVING PICTURE.

Application filed December 13, 1922. Serial No. 606,634.

This invention relates to means and process for producing moving pictures and has for its primary object to produce moving picture films or moving pictures therefrom in an improved way which involves a much higher light efficiency than in present well known methods, and in consequence thereof makes it possible to secure certain results which are not attainable by present well known methods. One of the objects of the present invention is to provide improved moving picture apparatus which operates with a continuously moving film or web, thus making it unnecessary to momentarily arrest the movement of the film or web for each successive picture. In consequence, I am able to eliminate the usual shutter mechanism by the use of which a large amount of light is lost and which together with the necessity for accelerating and stopping the film for every exposure, imposes such mechanical handicaps on present well known moving picture apparatus as to place an undesirably low speed limit on the operation of such apparatus. According to the present invention, these limitations are removed, it being possible to operate the film or web at much higher speed, thus practically eliminating the very undesirable fluctuation in the amount of light thrown on the screen which is too trying to the eyes of the observer. This greatly increased speed may be employed to great advantage for recording fast moving objects as well as for the mechanical mixing of colors. On the other hand, in view of the substantially continuous beam of light which is maintained and the slight degree of loss in light, it becomes practicable to operate a moving picture film at a much lower speed than is now required in the present well-known machines, for good results. Better exposures and more sharply defined details are therefore made possible for slow moving and stationary objects. It will furthermore be obvious from the following specification that this increased light efficiency in the taking and reproduction of pictures, makes it possible to secure greater detail in pictures, a feature of vast importance, in the reproduction of scientific films for example various constructional advantages are derived from the hereinafter described method of reproducing moving pictures which need not be specifically referred to. The present application is related to my application on the same subject matter filed July 29th, 1916, Serial No. 112,028, and application Serial No. 281,761 filed March 10, 1919.

Figures $1^B$, $2^B$ and $3^C$ are similar optical diagrams for another angle of alpha.

Figure 1:
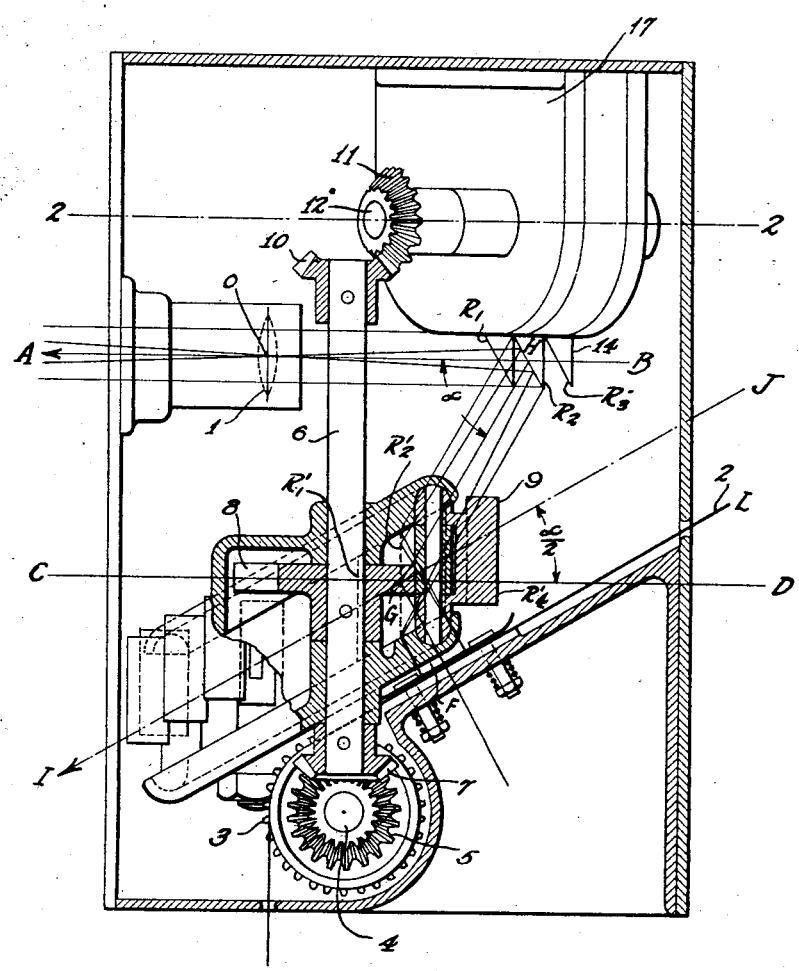
Figure 1 is a side elevation of a preferred embodiment of my invention, parts being broken away and parts shown in section.
Figure 2A:
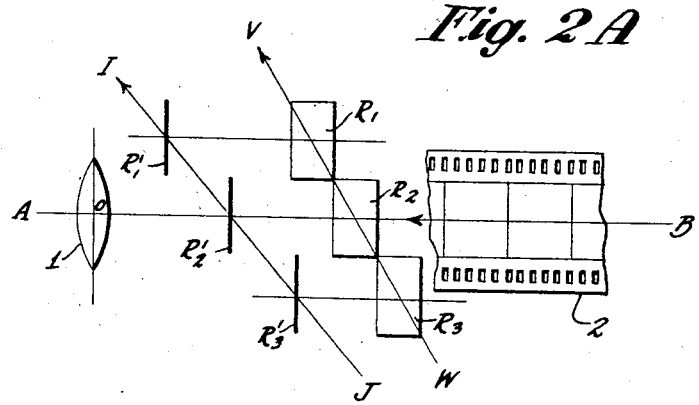
Figure 2 is a section on the line 2—2, Figure 1, parts being shown in plan.
Figures 1A, 3A:
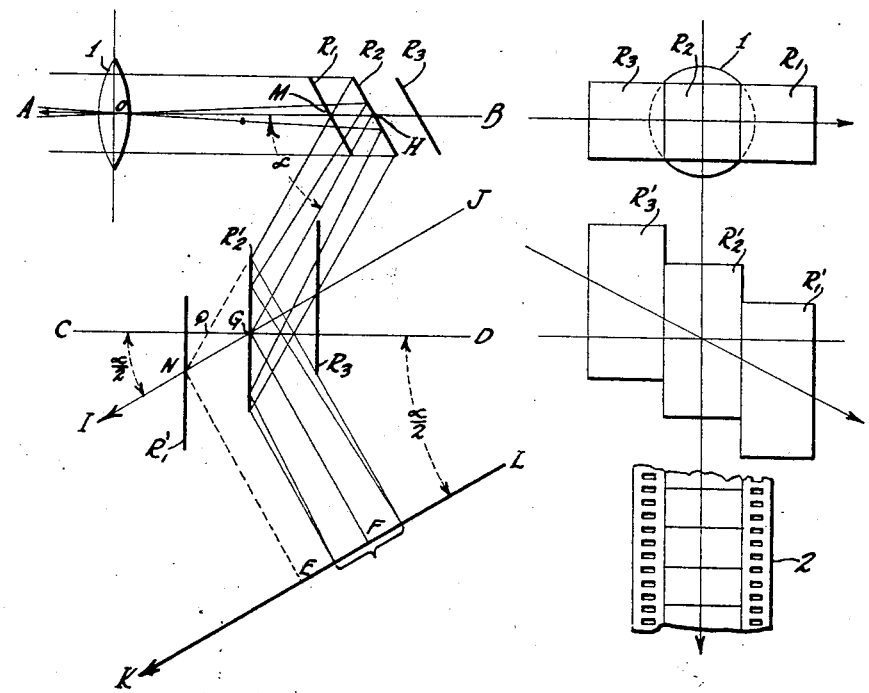
Figure 3 is a rear elevation of the same, with the housing and other parts removed, Figures $1^A$, $2^A$ and $3^A$ are optical diagrams corresponding to Figures 1, 2 and 3 respectively and in which the mirrors or light transmitting elements while passing the common central vertical plane of lens and film, have their common line of centers in said plane at an angle alpha to the axis of said lens.
Figure 2:
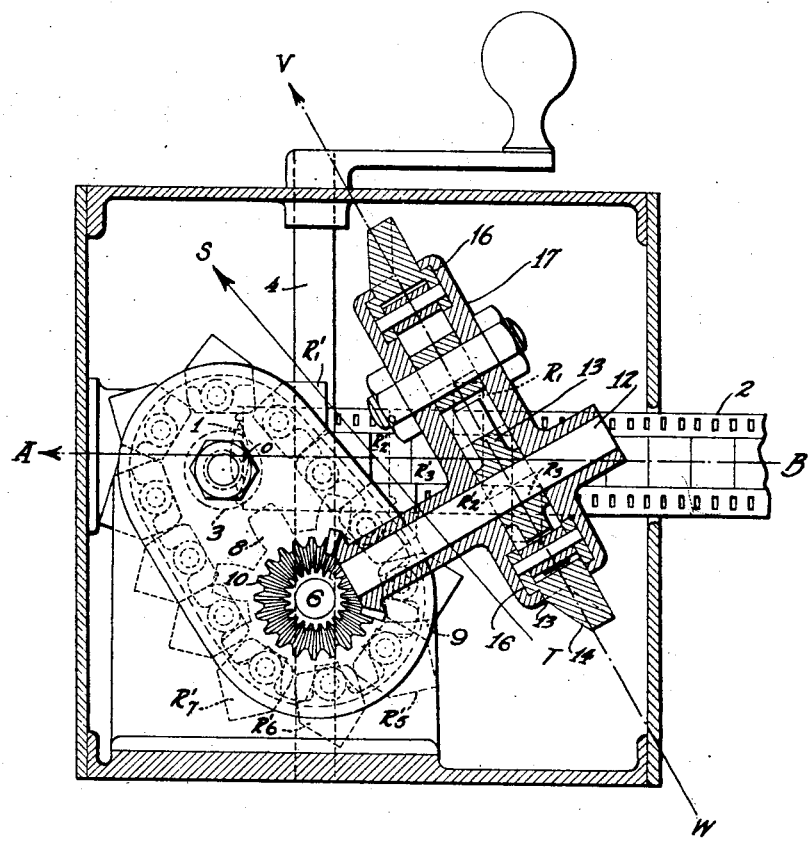

Referring more particularly to the drawings, in the embodiment shown in Figures 1 and 2, which illustrate the projection of pictures according to my invention, a lens 1 is suitably mounted with its axis in the central plane (preferably vertical) of a film or web 2, moving toward the left and downwardly according to Figure 1. According to this embodiment of my invention, a series of light-transmitting elements in the form of reflectors $R_1'$, $R_2'$, $R_3'$ are suitably arranged and mounted to be passed successively into position to reflect rays of light which pass upwardly thru the film 2 when the machine is a projector and downwardly to said film when said machine is a camera. The path over which these reflectors travel, includes a zone of approach to and a zone of recedence from a central position with respect to said central plane of the web 2 which includes the axis of lens 1. Another series of light transmitting elements in the form of reflectors $R_1$ $R_2$ $R_3$ are suitably arranged and mounted to travel over a path which also includes a zone of approach to and a zone of recedence from said plane. According to the embodiment of my invention shown in Figures 1, 2 and 3, the zones of approach and recedence of the path of said elements $R_1$ $R_2$ $R_3$ are preferably arranged in a horizontal plane thru the axis of the lens along a line W V while the similar zones for elements $R_1'$ $R_2'$ $R_3'$ are arranged in a plane parallel to the film along a line JI. These series of elements are caused to travel thru these zones of approach and recedence, by means hereinafter described, in such a way that they cooperate in pairs to momentarily flash the light rays between lens and film at times corresponding to the passage of successive portions of said film across an area which is exposed to said light rays. On the drawings, the line AB represents the lens axis. As shown in Figure 2$^A$, the mirrors R$_2'$ and R$_2$ respectively moving along the paths of travel J—I and W V, have, reached cooperating positions in which their centers lie in the central plane of the web which contains the lens axis. The relations of these parts are shown in side elevation in Figure 1$^A$ in which H represents the center of mirror R$_2$ in the lens axis AB, and G represents the center of mirror R$_2'$ in the line JI and also momentarily in the common plane of axis and film. At this instant, the broken line A H G F represents a light ray between lens and film by way of the centers of mirrors R$_2'$ and R$_2$. The lines A—B and C—D determine a vertical plane which is normal to the film and includes the center line of said film. A plane which is parallel to the film and includes the line JI, makes an angle with the line CD equal to one half of the angle between the line AD (axis of the lens) and the portion GH of the ray AHGF. The larger angle may be termed alpha and may be made of any desired extent within certain limits. According to Figures 1$^A$, 2$^A$ and 3$^A$, angle alpha is greater than 60 degrees. By an inspection of Figures 1$^A$, 2$^A$, 3$^A$, 1$^B$, 2$^B$ and 3$^B$, it will be seen that thruout their zones of approach and recedence, the mirrors of each series are maintained parallel to each other while the mirrors of each cooperating pair of mirrors while moving along diverging lines, are maintained at constant angles with each other. It will furthermore be understood that the line of centers of each pair of cooperating mirrors is always either coincident with or parallel to the vertical plane thru the film which includes the axis of the lens. In view of the fact that the mirrors R$_1$ R$_2$ R$_3$ maintain a constant angle with the lens axis, and have their centers traveling in the horizontal plane which includes the lens axis, their distances from the lens correspond to the projections of their centers on the lens axis. The movement of each of the mirrors R$_1'$ R$_2'$ R$_3'$ is the equivalent of or may be considered as a resultant of two movements, one of these movements being represented by a travel of lens center G from G to N in the plane referred to above and the other of these movements being represented by a movement from said plane in a direction normal thereto. Obviously, the second mentioned movement does not effect any change in the length of a light ray which travels between lens and film. It will be seen from the following demonstration that the light ray OHGF is equal in length to the light ray OMNE or in other words that the light rays transmitted by all pairs of mirrors which are in light transmitting positions with respect to lens and film, are of equal length. Thus,—

Draw line CD thru G parallel to lens axis AB and within the central plane of the film which includes said axis. The path of mirrors R$_1'$ R$_2'$ R$_3'$ is selected to lie in a plane which is normal to the central plane of the film including the lens axis but at an angle one-half alpha to said lens axis.

Therefore angle AHG=alpha, and
angle OGI=angle JGD=one half alpha.
Also angle JGD=angle HGJ=angle GNQ.

Therefore angle QGN=angle GNQ so that line GQ=line QN=HM, since HM and QG are parallel and cut by parallel lines AB and CD. It will be seen therefore that the rays OHGF and OMNE are equal and all rays are maintained in focus during the transitions thru the zones of approach and recedence.

Figure 3:
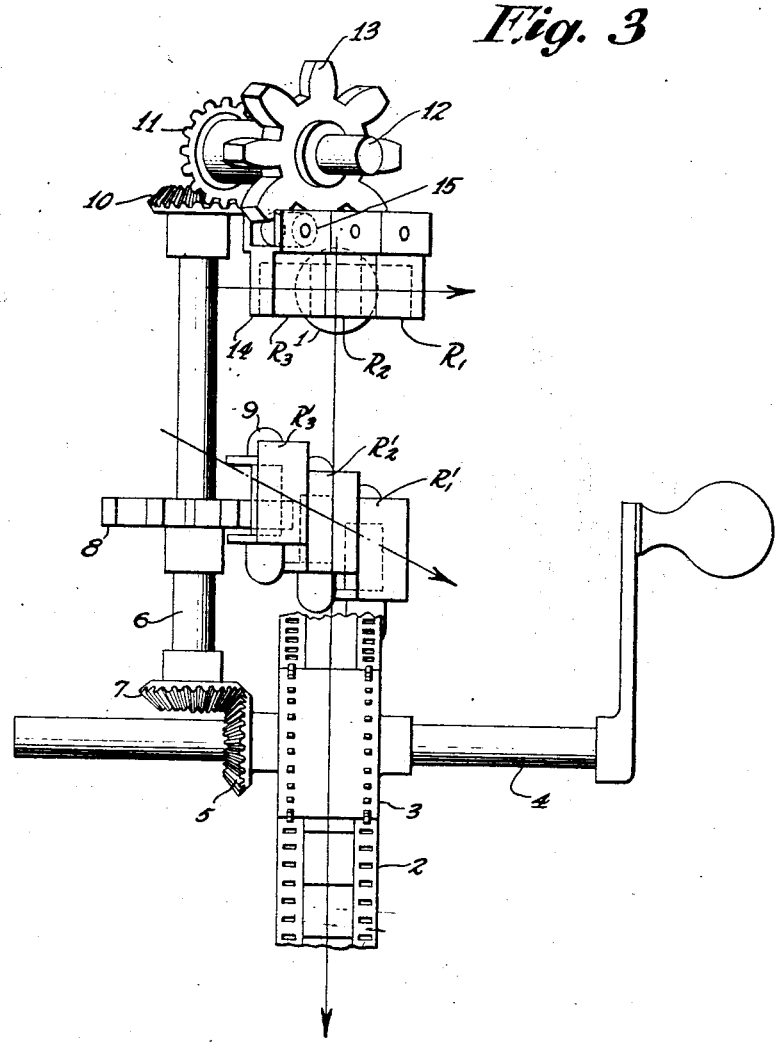

Referring now to Figures 1, 2 and 3, these views show suitable mechanism for carrying out the principles of my invention. Thus the film 2, which may be the usual film in common use at the present day, is driven by engagement with axially spaced sprockets 3 which are keyed to a shaft 4, said shaft being provided with a crank arm at one end. A bevel gear 5 is adapted to transmit power to a vertical shaft 6 which carries at its lower end a bevel gear 7 in mesh with the bevel gear 5. Shaft 6 carries a driving sprocket 8 which moves the lower series of reflectors. Slidably mounted between oppositely arranged and obliquely disposed guides is an endless chain of mirror carriers 9 which are provided with the mirrors R$_1'$ R$_2'$ R$_3'$ and by means of which said mirrors are carried thru the zones of approach and recedence as pointed out in connection with the optical diagrams shown in Figures 1$^A$, 2$^A$, 3$^A$, 1$^B$, 2$^B$ and 3$^B$. At its upper end, the shaft 6 is provided with a bevel pinion 10 which is in mesh with a second bevel gear 11 on a shaft 12. A driving sprocket 13 which is keyed to the shaft 12 comes into driving relation with rollers 15 carried by successive carriers 14 which are provided with the upper series of mirrors R$_1$ R$_2$ R$_3$ etc. Said carriers 14 have their opposite ends slidably mounted in guiding grooves 16 which are formed in the inwardly presented walls of the housing 17 within which the driving sprocket 13 is journalled. The advantages of my improved moving picture machine will now be readily understood and briefly related are as follows: A continuous movement of all operating parts, does away with various objections of the intermittently movable films, Thus it is not necessary to stop and start the film at each exposure nor operate a shutter. In consequence, wear and tear on the apparatus is largely eliminated, less power is required to operate, a much higher light efficiency is obtainable and the machine is capable of greatly increased speed and numbers of exposures in a unit of time, thus making it possible to avoid flickering and the resultant eye strain. Furthermore, the usual well known film can be used in the machine to produce a continuous series of exposures without interrupting blanks of illuminated areas.

It will be understood that in the actual manufacture of the machine as well as in the principles involved in the same, I may employ various mechanical equivalents of the elements shown and described in the specification. In view of the possible variations in the arrangement of the optical and mechanical parts which can be made to produce the same results, I desire to use the term embodied in the following claims in their broadest sense to cover the principle of operation irrespective of the specific means employed for putting it into effect.

I claim:

1. In a moving picture machine, a film, a series of light deflecting elements travelling in a straight line and having constant angular relation to the plane of said film and their centers travelling in a path parallel to said plane, a lens, and another series of light deflecting elements traversing the axis of said lens and movable successively into and out of the path of a beam of light passing between said lens and film by way of cooperating pairs of elements of both of said series.

2. In a moving picture machine, a lens, a film centrally disposed with respect to a plane which includes the axis of said lens, a series of light deflecting elements moving in a path which intersects said lens axis, and a second series of light deflecting elements moving in a path which intersects said plane, the elements of one of said series cooperating successively with the elements of the other series for deflecting a beam of light between said lens and film.

3. In a moving picture machine, a film, a lens, a series of light deflecting elements traversing the axis of said lens in a horizontal plane, a film centrally disposed with respect to a vertical plane including said lens axis, and a second series of light deflecting elements which pass through said vertical plane at an angle to said horizontal plane, said series cooperating to flash beams of light between said lens and film.

4. The combination with a lens, of a series of reflectors travelling along an axis of movement which intersects the axis of said lens, a second series of reflectors travelling along an axis of movement which deviates from the plane common to the first mentioned axes, but intersects a plane normal to the plane of said axes, and a film centrally disposed with respect to said normal plane, cooperating reflectors of said series being arranged as they approach and recede from said normal plane with a line joining their centers in a plane parallel to or coincident with said normal plane to momentarily focus said lens on the film.

5. The combination with a lens, of a series of reflectors travelling along an axis of movement which intersects the axis of said lens, a second series of reflectors travelling along an axis of movement which deviates from the plane common to the first mentioned axes, but intersects a plane normal to the plane of said axes, and a film centrally disposed with respect to said normal plane, cooperating reflectors of said series being arranged as they approach and recede from said normal plane with a line joining their centers in a plane parallel to or coincident with said normal plane to momentarily focus said lens on the film, a ray of light passing through said lens having an angle of incidence on a reflector in one series twice as large as its angle of incidence on the cooperating reflector of the other series.

6. The combination with a lens, of a series of reflectors travelling along an axis of movement which intersects the axis of said lens, a second series of reflectors travelling along an axis of movement which deviates from the plane common to the first mentioned axes, but intersects a plane normal to the plane of said axes, and a film movable in a plane parallel to the axis of movement of said second series of reflectors.

7. The combination with a lens, of a series of reflectors travelling along an axis of movement which intersects the axis of said lens, a second series of reflectors travelling along an axis of movement which deviates from the plane common to the first mentioned axes, but intersects a plane normal to the plane of said axes, and a film centrally disposed with respect to said normal plane, cooperating reflectors of said series being arranged as they approach and recede from said normal plane with a line joining their centers in a plane parallel to or coincident with said normal plane to momentarily focus said lens on the film, the central plane of said film containing the axis of said lens and the paths of both series of reflectors deviating from each other.

8. In a moving picture machine, a lens, a film centrally disposed with respect to a plane including the axis of said lens, and two series of light-deflecting elements of which the successive elements of one series cooperate with successive elements of the other series in transmitting flashes of light between said lens and film, each element of cooperating pairs having its center moving in a straight line which intersects said plane at a fixed angle.

9. In a moving picture machine, a lens, means for continuously moving a moving picture film, series of light deflecting elements movable into and out of positions to establish paths for light rays of constant length between said lens and a film driven by said moving means, the light deflecting elements of one series moving in a path which intersects the axis of said lens and the light deflecting elements of the other series moving in a path which intersects a plane normal to said film, and means for maintaining a constant angular relation between the cooperating light deflecting elements of different series during their cooperating periods.

10. The method of producing motion pictures which consists in projecting a beam of light through a standard motion picture film, causing said film to move at a constant speed, directing the transmitted beam upon one or more of a series of deflectors, moving said deflectors consecutively across the path of said transmitted beam in an oblique direction to the direction of movement of the film, employing said deflectors to deflect said transmitted beam upon one or more deflectors of a second series, and causing said deflectors of the second series to move consecutively across said deflected beam at a speed different from the speed of the deflectors of the first series and in a path having angular relation to the axis of the objective, whereby continuously projected images of the film may be produced upon a screen.

11. The method of producing motion pictures which consists in projecting a beam of light through a standard motion picture film, causing said film to move at a constant speed, directing the transmitted beam upon one or more of a series of deflectors, moving said deflectors consecutively across the path of said transmitted beam in a plane parallel to the plane of the film and in an oblique direction to the movement of the film employing said deflectors to deflect said transmitted beam upon one or more deflectors of a second series, and causing said deflectors of the second series to move consecutively across said deflected beam in a path having angular relation to the axis of the objective and also angular relation to the plane of the film, whereby continuously projected images may be produced upon a screen.

12. The method of producing motion pictures which consists in causing a standard motion picture film to travel at a constant speed, projecting a beam of light through said film in a continuous manner and bending the transmitted beam twice before passing it through a lens through the employment of two series of deflectors, causing the deflectors of both series to travel along endless paths at constant speeds and with the deflectors of one series travelling at a different speed than the deflectors of the other series to bring the deflectors of each series successively into cooperative relation to act upon the transmitted beam for the purpose of bending the same with an angle of incidence on the deflectors and one series greater than forty-five degrees and the angle of incidence of the cooperating deflectors of the other series less than forty-five degrees.

13. The method of producing motion pictures which consists in causing a standard motion picture film to travel at a constant speed, projecting a beam of light through said film in a continuous manner and bending the transmitted beam twice before passing it through a lens through the employment of two series of plane surfaced deflectors, causing the deflectors of each series to travel across the light beam, with the deflectors of one series moving at a different speed than the deflectors of the other series, to move the deflectors of each series into and out of cooperative relation with one another and with the beam for the purpose of bending the transmitted beam with an angle of incidence on the deflectors of one series greater than forty-five degrees and the angle of incidence on the cooperating deflectors of the other series less than forty-five degrees.

14. The method of producing motion pictures which consists in moving a film along a path wherein the medial line of the film and the axis of the lens will lie in a common plane and with the direction of movement of the film in oblique relation to the axis of the lens, passing a beam of light through the film and thence to the lens and bending such beam of light between the film and lens twice by two series of deflectors, and causing said deflectors to travel across the beam in such directions that the beam will have an angle of incidence with the deflectors of one series of greater than forty-five degrees and that such beam will have an angle of incidence with the deflectors of the other series of less than forty-five degrees.

15. The method of producing motion pictures which consists in moving a film along a path wherein the medial line of the film and the axis of the lens will lie in a common plane and with the direction of movement of the film in oblique relation to the axis of the lens, passing a beam of light through the film and thence to the lens, and bending such beam of light between the film and lens twice by two series of deflectors causing said deflectors to travel across the beam in such directions that the beam will have an angle of incidence with the deflectors of one series of greater than forty-five degrees and that such beam will have an angle of incidence with the deflectors of the other series of less than forty-five degrees, and synchronizing the movement of the deflectors and film so that they will continuously move in synchronism.

16. The combination with a lens of a series of deflectors travelling along an axis of movement which intersects the axis of said lens, a second series of deflectors travelling along an axis of movement which deviates from the plane common to the first mentioned axes, but intersects a plane normal to the plane of said axes, and a film centrally disposed with respect to said normal plane, the deflecting surfaces of all of said deflectors being so disposed that light projected through the film will be deflected from at least one of the deflectors of one series on to at least one of the deflectors of the other series and thence through the lens.

17. The combination with a lens of a series of deflectors travelling along an axis of movement which intersects the axis of said lens, a second series of deflectors travelling along an axis of movement which deviates from the plane common to the first mentioned axes, but intersects a plane normal to the plane of said axes, and a film centrally disposed with respect to said normal plane, whereby a ray of light passing through said lens will have an angle of incidence on a deflector in one series twice as large as its angle of incidence on the cooperating deflector of the other series.

In testimony whereof I have signed the foregoing specification.

WILHO A. KOSKEN.